United States Patent [19]

Lenden

[11] Patent Number: 4,852,289
[45] Date of Patent: Aug. 1, 1989

[54] LATCH FOR A HOOK SETTING MECHANISM FOR FISHING RODS

[76] Inventor: David G. B. Lenden, Orchard East Road, R.D.2,, Ngatea, New Zealand

[21] Appl. No.: 119,562
[22] Filed: Nov. 12, 1987

[30] Foreign Application Priority Data
Nov. 14, 1986 [NZ] New Zealand .................. 217211

[51] Int. Cl.⁴ .................................. A01K 97/12
[52] U.S. Cl. .................................................. 43/15
[58] Field of Search ............................ 43/15, 21.2

[56] References Cited

U.S. PATENT DOCUMENTS

| | | | |
|---|---|---|---|
| 3,007,275 | 11/1961 | Standley | 43/15 |
| 3,470,648 | 10/1969 | Bowker | 43/21.2 |
| 3,897,646 | 8/1975 | Sheets | 43/15 |
| 4,159,589 | 7/1979 | Pendegraft | 43/15 |
| 4,235,035 | 11/1980 | Guthrie | 43/15 |
| 4,461,113 | 7/1984 | Erwin | 43/15 |
| 4,676,018 | 6/1987 | Kimball | 43/15 |

FOREIGN PATENT DOCUMENTS 555966 2/1957 Italy ........................................ 43/15

Primary Examiner—Gene P. Crosby
Attorney, Agent, or Firm—Abelman, Frayne, Rezac & Schwab

[57] ABSTRACT

A latch for a hook setting mechanism for fishing rods is provided by a latching ball which is held in engagement with a latching indentation of a keeper rod by a rotatable cam, the cam being rotatable by a trigger arm which is moved in response to a tug exerted on a fishing line of the fishing rod.

1 Claim, 4 Drawing Sheets

LATCH FOR A HOOK SETTING MECHANISM FOR FISHING RODS

FIELD OF THE INVENTION

This invention relates to a latch having particular utility in a hook setting mechanism for fishing rods.

BACKGROUND OF THE INVENTION

Hook setting mechanisms for fishing rods are well known in the art. Typical of such mechanisms is the one disclosed in Standley U.S. Pat. No. 3,007,275. Standley teaches the support of a fishing rod on a leaf spring, the leaf spring being held in a stressed or set position by a latching mechanism. The latching mechanism is released by a trigger arm, which is moved by a tug exerted on the fishing line, the fishing line being entrained around the trigger arm. If a tug of sufficient force is exerted on the fishing line, the trigger arm is rotated, in turn releasing the latching mechanism, and in turn releasing the keeper, thus allowing the stressed spring to exert a sharp tug on the fishing rod by moving the fishing rod angularly in a quick movement to set the hook of the fishing line.

Standley's latch mechanism is however non-positive under certain circumstances, which can cause the latch to release in the absence of movement of his trigger arm as caused by a tug on the fishing line.

SUMMARY OF THE INVENTION

It is the object of this invention to provide a latch for a hook setting mechanism for fishing rods which is entirely positive in its action, and which can only be released by appropriate movement of the trigger arm, the latch remaining locked under all other conditions.

It is the further object of this invention to provide a latch for a hook setting mechanism for fishing rods which is of greater sensitivity than those previously proposed, and which will operate with a minimal of frictional restraint, thus ensuring rapid disengagement of the latch, but only when specifically intended.

According to the present invention, the latch for a hook setting mechanism for fishing rods includes a keeper block having a first bore extending therethrough, the first bore being intersected by a second bore extending transversely to the first bore, and also being intersected by a third bore spaced from the second bore and which also extends transversely of the first bore.

A keeper rod is slidably mounted within the second bore, the keeper rod having at least on indentation in its axial surface.

A latching ball is freely moveable within the first bore of the keeper block, and is of a diameter such that it is partially receivable within the latching indentation of the keeper rod.

A cylindrical cam member is positioned in the third bore, this cylindrical cam member having a camming surface which is operative to move the latching ball into latching engagement with the indentation of the keeper rod when the cylindrical cam member is rotated angularly from a first position to a second position. When the camming member is in the second position, the latching ball is positioned on a continuous surface of the cylindrical cam member and in latching engagement with the indentation in the keeper rod, thus locking the latch in that position.

In the locked position, any axial forces exerted on the keeper rod are dissipated in the keeper block, the keeper rod being locked and immovable until such time as the cylindrical cam member is rotated reversely. Thus, accidental release of the latch, such as otherwise could be caused by forces exerted on the fishing rod itself or on other parts of the hook setting mechanism, is precluded in its entirety. The latch is held locked in the latched or set position at all times other than when the trigger arm and the cylindrical cam member are rotated reversely to their initial unlocked positions.

By virtue of the positive locking of the latch, greater safety is afforded to persons in the location of the fishing rod when intentionally set in readiness for a strike by a fish. Vibration, wind loads and movement of the hook setting mechanism itself when mounted on a boat or other moving object all are ineffective to cause release of the latch, the only possibility of releasing the latch being by either manually rotating the trigger arm, or, by pulling on the fishing line.

DESCRIPTION OF THE DRAWINGS

Preferred embodiments of the invention will now be described with reference to the accompanying drawings, in which.

DESCRIPTION OF THE PREFERRED EMBODIMENTS

Figure 1:
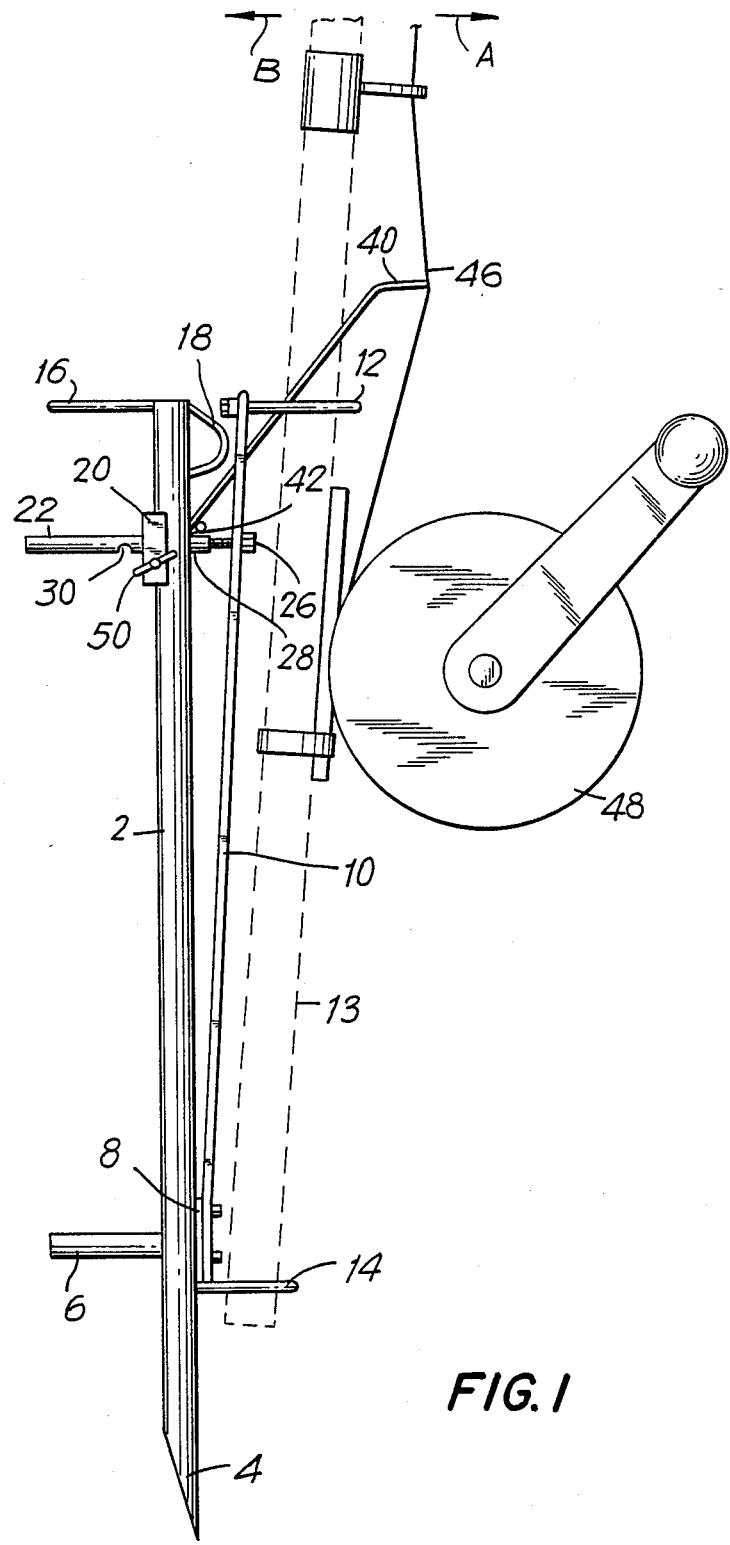
FIG. 1 is a diagramatic illustration of a hook setting mechanism incorporating the latch of the present invention.

Referring firstly to FIG. 1, the trigger setting mechanism includes a body part 2, which can be provided by a length of angle iron of about 100 centimeters long, and which is provided at its lower end with a point 4 for driving into the ground. A lug 6 enables the angler to drive the body into the ground with a spade like action. Secured to the lower end of the body part 2, such as by plate 8 welded thereto is a leaf spring 10, the leaf spring having a ring shaped member 12 secured to its upper end for the reception of a fishing rod indicated by the chain dotted lines 13. A further ring shaped member 14 is provided at the lower end of the spring 10 for the reception of the lower end of the rod 13.

At its upper end, the body part 2 is provided with a ring shaped member or handle 16, which can be grasped by one of the user's hands, and the other of the users hands employed to force the rod 13 in the direction of the arrow A against the bias of the leaf spring 10. Ultimately, the rod will be returned to its initial position in the direction of the arrow B on release of the latch later to be described. Preferably, a bumper 18 is provided to limit the extent of the return movement.

When moved sufficiently in the direction of the arrow A, the leaf spring 10 and the fishing rod 13 can be locked in that position by a keeper rod 22, which is slidably mounted in a keeper block 20, and which is attached to the leaf spring by a bolt 26 through the intermediary of a hinge 28.

The keeper rod 22 and the latching mechanism associated therewith will now be described with reference to FIG. 2. The keeper rod 22 has at least one indentation 30 in its outer surface, and preferrably one or more additional indentations such as the indentation 32. The keeper rod 32 extends through a transverse bore in the keeper block 20, the keeper block 20 having an axial bore 34 in which a latching ball 32 is freely moveable.

Positioned immediately beneath the ball 32 is a cylindrical cam member 38 which is rotatable in a bore extending transversely of the axial bore 34, and also transversely of the bore in which the keeper rod 22 is slidable.

Attached to the cylindrical cam member 38 is a trigger arm 40, which is rigidly connected to the cylindrical cam member 38 such that movements of the trigger arm 40 angularly of the axis of the cylindrical cam member 38 will result in corresponding angular movements of the cylindrical cam member 38.

Figure 2:
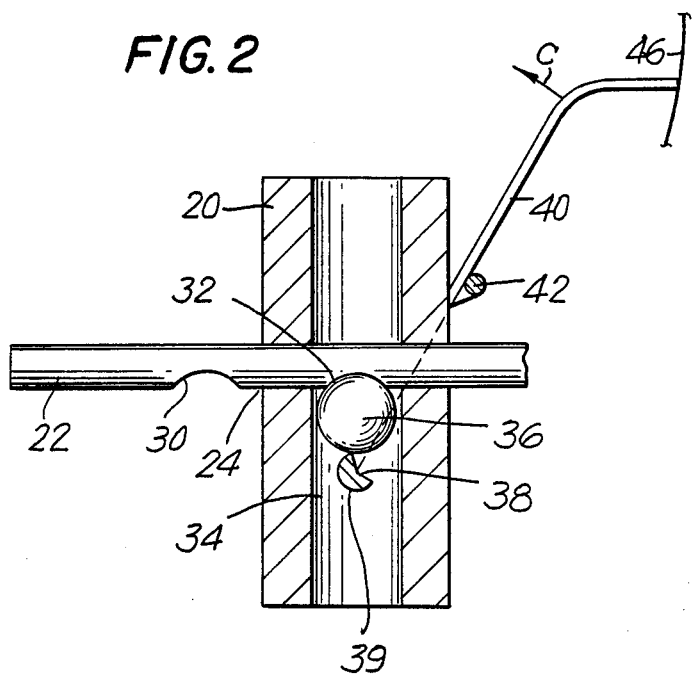
FIG. 2 is a fragmentary cross-section through the latch of the present invention.

The latch in FIG. 2 is shown in a locked position in which the latching ball 36 has been forced upwardly into the latching indentation 32 of the keeper rod 22 by the cylindrical cam member 38. At this time, the latching ball 36 is trapped within the recess 32, and is held immovable in that position by the engagement of its periphery with an outer cylindrical surface 39 of the cylindrical cam member 38.

Thus, the latching ball 36 and the keeper rod 22 are at that time held immovable relative to each other, and, axial movement of the keeper rod to any material extent is precluded. Any forces exerted on the fishing rod 23 itself or on the hook setting mechanism will be incapable of causing movement of the keeper rod. This ensures greater safety to persons in the vicinity of the hook setting mechanism when in its set position, and also precludes the release of the latch in the event of impact on the fishing rod or on the body part 2, or, in the presence of wind loading on the fishing rod 13 or other vibrations.

The latch only can be released by movement of the trigger arm 40 in the direction of the arrow C, which normally will be under the influence of a tug exerted on the fishing line 46, at which time the trigger arm will move in the direction of the arrow C, and in so doing will move the inset camming surface of the cylindrical cam member 38 into alignment with the periphery of the latching ball 36. When this happens, the latching ball 36 can move downwardly in the axial bore 34 of the keeper block 20, and in so doing become disengaged from the indentation 32 formed in the keeper rod 22. A downward movement of the ball 36 will in fact be assisted by a downward camming effect exerted on the latching ball 36 by the keeper rod 22, which is at that time under axial loading as produced by the leaf spring 10.

As will be appreciated, by the provision of more than one latching indentations, such as the indentations 30 and 32 in the keeper rod 22, provision is made for adjustment of the extent to which the leaf spring 10 is stressed, and thus, to the extent to which the fishing pole 13 will whip on release of the latch in order to produce its hook setting motion.

As is well known in the art, the fishing line 46 is reeled unto a fishing reel 48, and, at its trailing end is provided with a baited hook.

Provision can be made for increasing the restraint on movement of the trigger arm 40, which conveniently can be provided by a wing nut 50 attached to the cylindrical cam member 38, and which reacts against a friction washer (not shown).

In order to set the latch, the fishing rod 13 is moved away from the body part 2 to the desired extent, and then, the trigger arm 40 is pushed forwardly in a direction opposite to the arrow C, this causing the latching ball 38 to move upwardly into latching engagement with the latching recess 32, the end of latching movement being indicated by the engagement of the trigger arm 40 with a stop member 42.

Figure 4:
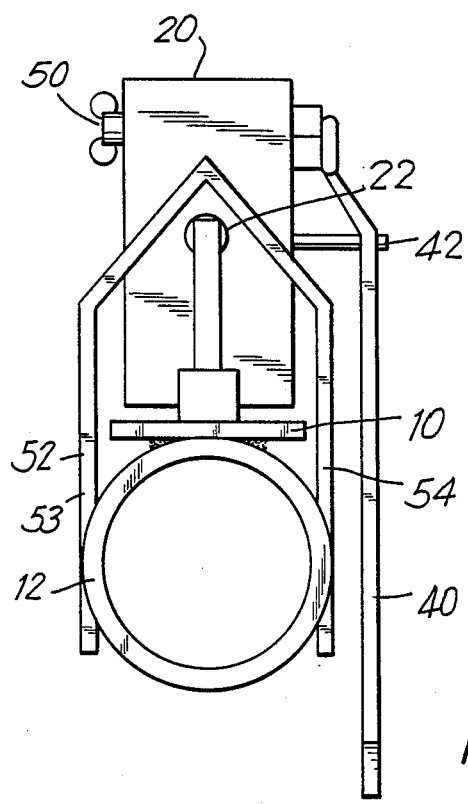
FIG. 4 is a plan view of FIG. 3.
Figure 3:
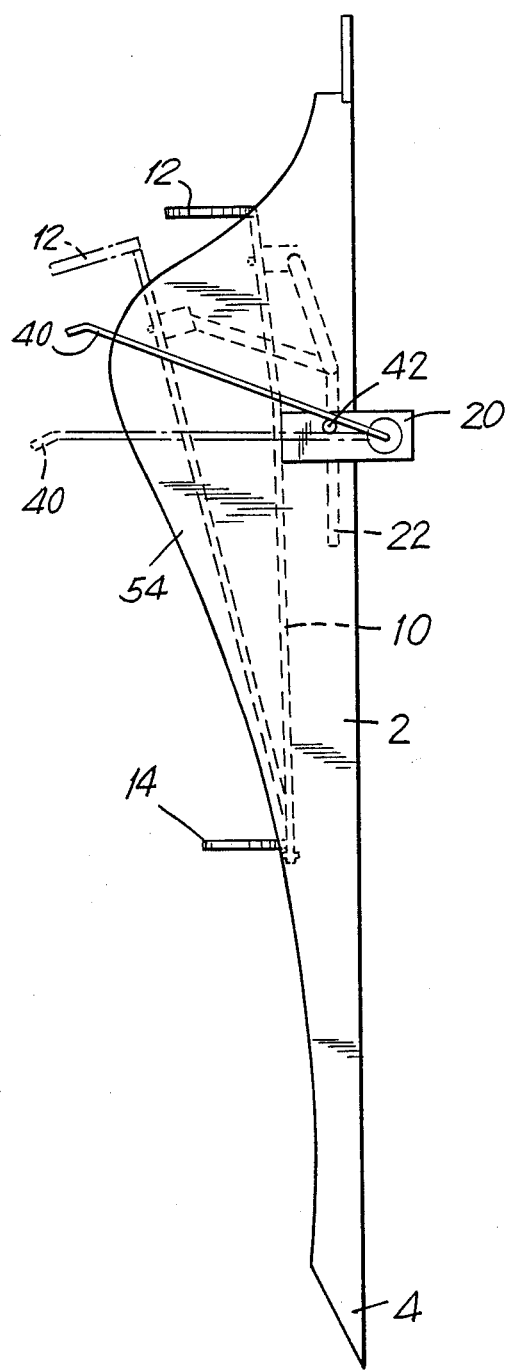
FIG. 3 is an illustration of a modified form of hook setting mechanism incorporating the latch of the present invention.

The latch of the present invention can be readily incorporated into other forms of hook setting mechanisms, such as the ones shown diagramatically in FIGS. 3 and 4, in which the same reference numerals have been employed to indicate elements in common with FIGS. 1 and 2.

In FIGS. 3 and 4, the major difference is the leaf spring 10 and the keeper rod 22 are contained within a channel-section body part 52 having side members 53 and 54 which extend forwardly to enclose the moving parts of the mechanism. As related in FIG. 2, the keeper block 20 has been rotated through 90° in a counter-clockwise direction, such that the keeper rod 22 is vertically arranged and the axial bore 34 of the keeper block is horizontally arranged. In all respects, the embodiment of FIGS. 3 and 4 operate in exactly the same manner as described above with reference to FIGS. 1 and 2.

Figure 5:
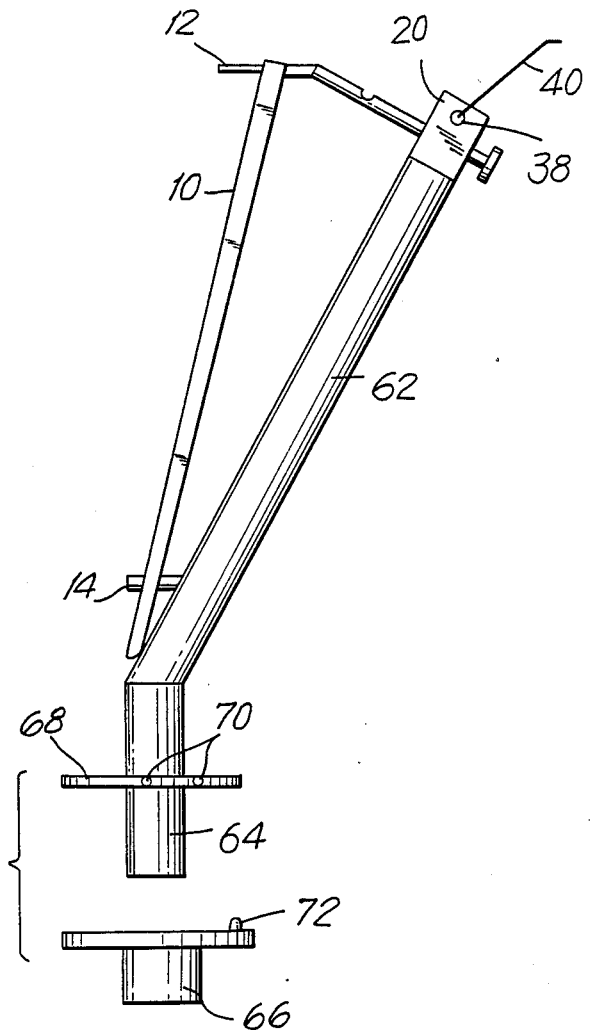
FIG. 5 is illustrative of another form of hook setting mechanism incorporating the latch of the invention.

The latch of the present invention equally well can be incorporated into a trolling post for mounting on the deck of a fishing launch, as illustrated in FIG. 5. In FIG. 5, a staunchen 62 corresponding with the body part 2 of the previous figures is provided at its lower end with a cylindrical post 64 for reception in a socket 66 secured in a deck of the fishing launch. The post 64 is provided with an anular plate 68 having projections 70 which cooperate with a stop 72 on the socket member 66, to limit rotational movement of the post 64. The remaining members of the assembly correspond with those illustrated in FIGS. 1 and 2, and operate in exactly the same manner as discussed above with respect to FIGS. 1 and 2.

What we claim is:

1. A latch for a hook setting mechanism for a fishing rod, comprising:

a keeper block having a first bore;

a second bore intersecting said first bore and extending transversely thereof;

a third bore intersecting said first bore, said third bore being spaced from said second bore in a direction axially of said first bore;

a keeper rod slidably mounted within said second bore, said keeper rod having at least one indentation for the reception of a latching ball;

a latching ball freely movable within said first bore and partially receivable within said indentation of said keeper rod;

a cylindrical cam member mounted for rotation within said third bore and having a camming surface for moving said latching ball into engagement with said indentation of said keeper rod upon rotation of said cylindrical cam member angularly from a first position to a second position, and for retaining said latching ball in latching engagement with said indentation of said keeper rod while in said second position; and, a trigger arm rigidly connected to said cylindrical cam member and extending radially of the axis thereof;

whereby, movement of said keeper rod to a latching position will permit movement of said latching ball into engagement with said indentation of said keeper rod, and in turn, will permit rotation of said cylindrical cam member by said trigger arm to a set position in which said latching ball is held in latching engagement with said indentation of said keeper rod, and thus holds said keeper rod against axial movement, and, subsequent reverse movement of said cylindrical cam member by said trigger arm will release said latching ball and in turn release said keeper rod.

* * * * *